US011119664B2

(12) United States Patent
Sun et al.

(10) Patent No.: US 11,119,664 B2
(45) Date of Patent: Sep. 14, 2021

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Lei Sun, Beijing (CN); Ruiyong Jia, Beijing (CN); Jianbin Kang, Beijing (CN); Jibing Dong, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/229,839

(22) Filed: Dec. 21, 2018

(65) Prior Publication Data
US 2019/0332287 A1    Oct. 31, 2019

(30) Foreign Application Priority Data
Apr. 28, 2018    (CN) .......................... 201810404832.8

(51) Int. Cl.
*G06F 3/06* (2006.01)
(52) U.S. Cl.
CPC .......... *G06F 3/0622* (2013.01); *G06F 3/0637* (2013.01); *G06F 3/0683* (2013.01)
(58) Field of Classification Search
CPC ............................................. G06F 3/06–0689
See application file for complete search history.

(56) References Cited

U.S. PATENT DOCUMENTS

| 6,457,098 | B1* | 9/2002 | DeKoning | G06F 3/061 |
| | | | | 711/114 |
| 7,721,144 | B2* | 5/2010 | Brown | G06F 9/52 |
| | | | | 714/6.12 |
| 8,627,015 | B2 | 1/2014 | Durocher et al. | |
| 2002/0188655 | A1* | 12/2002 | Brown | G06F 3/0659 |
| | | | | 709/201 |
| 2008/0147934 | A1* | 6/2008 | Nonaka | G06F 3/067 |
| | | | | 710/74 |
| 2012/0072641 | A1* | 3/2012 | Suzuki | G06F 12/0246 |
| | | | | 711/103 |
| 2013/0036279 | A1* | 2/2013 | Tatara | G06F 3/065 |
| | | | | 711/162 |
| 2015/0160871 | A1* | 6/2015 | Takakura | G06F 3/0665 |
| | | | | 711/114 |
| 2016/0124855 | A1* | 5/2016 | Gao | G06F 11/10 |
| | | | | 711/131 |
| 2019/0332271 | A1* | 10/2019 | Abouelwafa | G06F 3/0629 |

* cited by examiner

*Primary Examiner* — Nicholas J Simonetti
(74) *Attorney, Agent, or Firm* — BainwoodHuang

(57) ABSTRACT

Techniques manage a storage system. The techniques involve: in response to a first control unit of the storage system receiving an access request to a target storage area in the storage system, determining whether the target storage area is located in a first storage area or a second storage area; in response to the target storage area being located in the second set of storage areas, determining that a second control unit of the storage system processes the access request, the first control unit and the second control unit sharing the storage system; and updating an access state of the first control unit to the target storage area, the access state indicating access permission for the target storage area included in the first control unit. Such techniques can effectively reduce the number of CMI messages related to a stripe lock mechanism in a dual active SP.

13 Claims, 8 Drawing Sheets

METHOD, APPARATUS AND COMPUTER PROGRAM PRODUCT FOR MANAGING STORAGE SYSTEM

FIELD

Embodiments of the present disclosure generally relate to the field of data storage, and more specifically, to a method, an apparatus and a program product for managing a storage system.

BACKGROUND

In recent years, storage systems based on a redundant array of independent disks (RAID) have been developed greatly. The RAID-based technology is a data storage virtualization technology. Based on the virtualization technology, one or more storage systems as RAIDs can be created on a plurality of physical storage devices (e.g., disks) so as to provide various characteristics, such as data redundancy, performance improvements and the like. The RAID receives I/O requests from an external host, and writes and reads data in stripes. For example, during data writing, data of each stripe of the RAID can be written evenly into a plurality of disks for creating the system, such that the total data of the RAID are distributed evenly over the plurality of disks.

In order to further improve the access performance and redundant capability of the RAID, there arises a solution of managing the storage system using dual storage processors (dual SPs). The solution includes two SPs active simultaneously to implement concurrent management of and access to the RAID storage system. Since the two SPs receive and process access requests to the RAID simultaneously, data synchronization and safety measures are required to ensure that no error occurs in the data. As the I/O access frequency increases, it has become a research focus how to manage the I/O access under the dual-active-SP architecture more effectively.

SUMMARY

In general, embodiments of the present disclosure provide a method, an apparatus and a computer program product for managing a storage system.

In accordance with a first aspect of the present disclosure, there is provided a method of managing a storage system. The method includes: in response to a first control unit of the storage system receiving an access request to a target storage area in the storage system, determining (or identifying) whether the target storage area is in a first set of storage areas or in a second set of storage areas; in response to the target storage area being in the second set of storage areas, determining to process the access request by a second control unit of the storage system, the first and second control units sharing the storage system; and updating an access state of the first control unit to the target storage area, the access state indicating access permission of the first control unit to the target storage area.

In accordance with a second aspect of the present disclosure, there is provided an apparatus for managing a storage system, including: one or more processors; a memory coupled to at least one processor of the one or more processors; and computer program instructions stored in the memory, the computer program instructions, when executed by the at least one processor, causing the apparatus to perform acts including: in response to a first control unit of the storage system receiving an access request to a target storage area in the storage system, determining whether the target storage area is in a first set of storage areas or in a second set of storage areas; in response to the target storage area being in the second set of storage areas, determining to process the access request by a second control unit of the storage system, the first and second control units sharing the storage system; and updating an access state of the first control unit to the target storage area, the access state indicating access permission of the first control unit to the target storage area.

In accordance with a third aspect of the present disclosure, there is provided a computer program product being tangibly stored on a computer readable medium and includes machine executable instructions which, when executed, cause a machine to execute the method in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent through the detailed description of example implementations with reference to the accompanying drawings, in which the same reference symbols generally represent the same components.

DETAILED DESCRIPTION OF EMBODIMENTS

Figure 1:
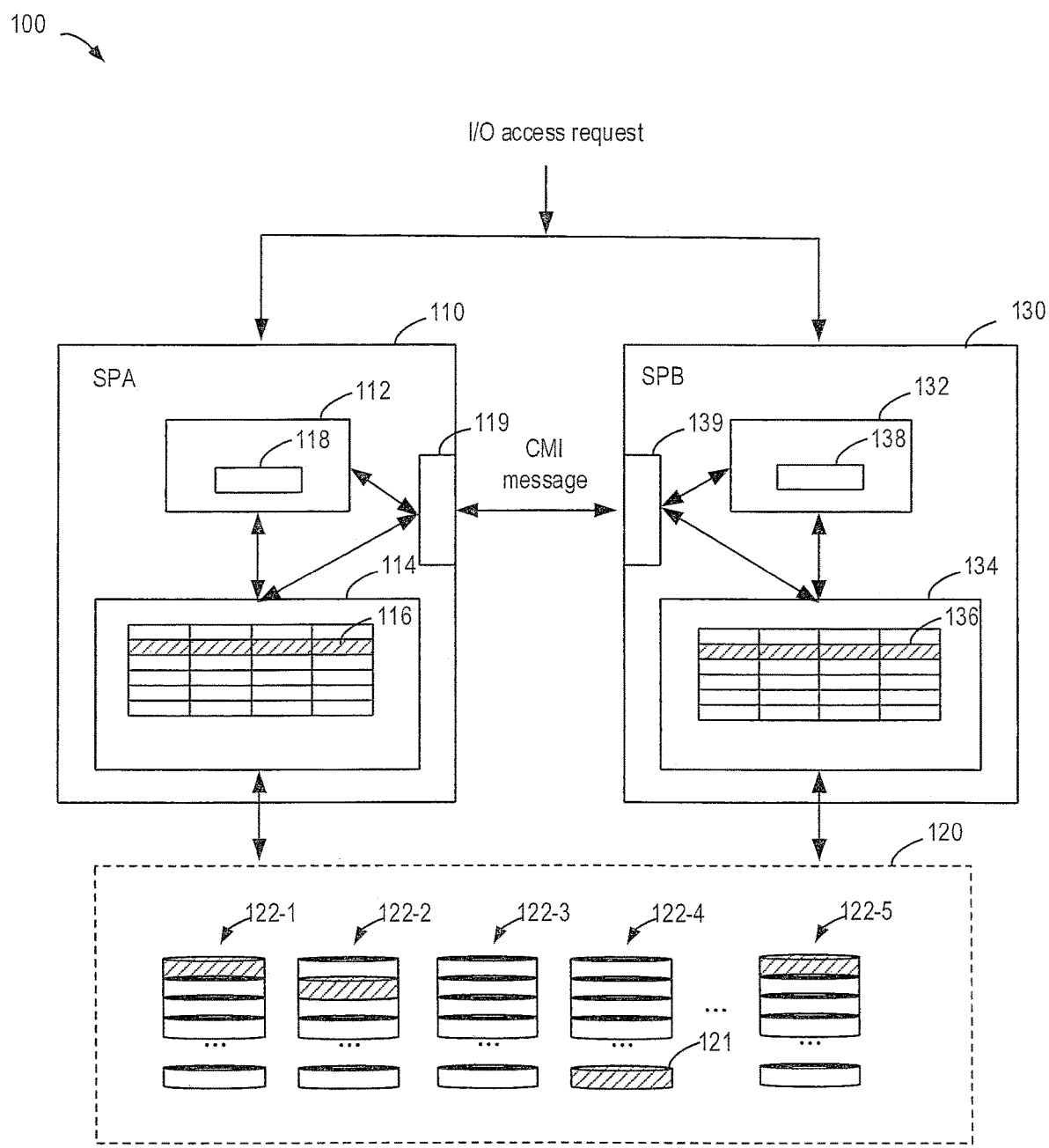
FIG. 1 illustrates a diagram of a storage management system 100 in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of example embodiments disclosed herein will now be described with reference to various example embodiments illustrated in the drawings. Although the drawings illustrate preferred embodiments of the present disclosure, it would be appreciated that description of those embodiments is merely to enable those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one further embodiment." The term "first," "second" or the like can represent different or the same objects. Other definitions, either explicit or implicit, may be included below.

FIG. 1 illustrates a diagram of a storage management system 100 in which embodiments of the present disclosure can be implemented. The storage management system 100 includes a first storage processor 110 (SPA), a second storage processor 130 (SPB), and a physical storage layer 120. The physical storage layer 120 includes a plurality of (for example, N+1) physical disks 122-1, 122-2, 122-3 . . . 122-5 for providing a physical storage space to the storage management system 100. In the following description, these disks can be collectively or separately referred to as a "storage device" or "disk" 122, and the present disclosure is not limited in this aspect. The disk 122 can be various non-volatile disks, and may include, by way of example and not limitation, a digital versatile disk (DVD), a blu-ray disk (BD), an optical disk (CD), a floppy disk, a hard disk, a tape drive, an optical drive, a solid-state memory device (SSD), or the like. Other disks capable of providing a storage space can also be used. Each disk 122 is divided into a plurality of segments 121. The plurality of segments 121 can have the same storage capacity. Sometimes, the segment 121 can also be referred to as a disk extent, a storage unit, or the like, and the physical storage layer 120 can also be referred to as a storage pool or a disk pool.

Within the SPA 110 and SPB 130, there may be one or more RAID groups. In FIG. 1, only one RAID group is shown within each SP for simplicity. Each of RAIDs 114, 134 is built on the plurality of segments 121 obtained by dividing the plurality of disks 122 of the physical storage layer 120. Such RAIDs 114, 134 are sometimes referred to as mapped RAIDs or distributed RAIDs. The RAIDs 114, 134 can include a plurality of stripes 113 (which are also referred to as RAID extents or RAID slices), and each stripe 113 is mapped to one or more segments 121 of one or more disks 122 in the physical storage layer 120. The number of segments 121 included in each stripe 113 can indicate a stripe width which is also referred to as a RAID width. For example, and without limitation, a stripe having a width of four segments is shown in the figure. When a user writes data into certain stripes 116, 136 of the RAIDs 114, 134, the written data will be stored in the plurality of physical segments 121 corresponding to the stripes 116, 136.

According to the dual-active-SP architecture as described herein, the RAIDs 114, 134 included in two SPs (namely, SPA 110 and SPB 130) of the storage management system 100 correspond to each other exactly, i.e., the plurality of stripes 116, 136 within the two RAIDs 114, 134 have one-to-one correspondence with each other, and the mapping of each stripe of the two RAIDs 114, 134 to the physical segments 121 in the storage management layer 120 also has one-to-one correspondence. That is, the SPA 110 and SPB 130 share the same logic storage space and can jointly access the logic storage space.

In accordance with the requirements of the RAID technology, each of RAIDs 114, 134 is distributed evenly over the plurality of available disks 122, i.e., the plurality of stripes of each of RAIDs 114, 134 are distributed as evenly as possible over the plurality of segments 121 of each available disk 122 in the physical storage layer 120. For example, as shown in FIG. 1, a stripe 116 of the RAID 114 is mapped to a segment 121 of the disk 122-1, a segment 121 of the disk 122-2, a segment 121 of the disk 122-4 and a segment 121 of the disk 122-5. It would be appreciated that FIG. 1 only illustrates an example of one stripe, and other stripes can be mapped likewise. It would also be appreciated that the number of the stripes 116 in the RAID and the width of each stripe 116 can be set flexibly. For the RAID 134 in the SPB 130, since its corresponding mapping is fully consistent with the RAID 116, the stripe 136 therein corresponds to the identical segments 121 as the stripe 116 in the SPA. It is to be understood that substantially the same number of segments 121 are allocated to the RAID from each available disk 122, so as to accomplish even distribution across the plurality of disks.

In the dual active SPs as described in FIG. 1, an I/O access request (which is also referred to as access request or I/O request hereinafter) from an external host is randomly transmitted to the SPA 110 or SPB 130, and simultaneously processed by the SPA 110 or SPB 130. The SPA 110 can include an access control unit 112 which can include high speed cache 118 (which is also referred to as multicore high speed cache or MCC) for receiving and caching the I/O access request and data from the external host, and flushing the I/O access request and data into the RAID 114 in the SPA 110. Similarly, the SPB 130 can include an access control unit 132 which can include high speed cache 138 for receiving and caching the I/O access request and data from the external host, and flushing the I/O access request and data into the RAID 134 in the SPB 130.

It would be appreciated that a plurality of concurrent I/O requests for the RAID 114 and RAID 134 from the external host can access the RAID 114 and RAID 134 simultaneously. Since the RAID 114 and RAID 134 correspond to the same physical storage space simultaneously, an access conflict inevitably emerges. For example, the SPA 110 might be performing a write operation on the stripe 116 in the RAID 114, and at the same time the SPB 130 might wish to write data into the stripe 136 corresponding to the stripe 116. As the two stripes correspond to the same physical segment 121, in this case, confusion or loss of user data inevitably occurs if no relevant measures are taken.

Conventionally, the following synchronous mechanism is utilized to strictly coordinate and control access operations of the SPA 110 and SPB 113 to the respective RAID 114 and RAID 134. Specifically, each access request needs to obtain operation permission for the current stripe (which is referred to as a stripe lock hereinafter) prior to performing the actual operation. Its principles are as follows.

1) For a write operation, each access request must obtain an exclusive stripe lock for a target stripe, so that other access requests (regardless of read or write operations) thus are unable to access the target stripe.

2) For a read operation, each access request needs to obtain a shared stripe lock for a target stripe. In this circumstance, other access requests can also obtain the shared stripe lock if they also need to perform read operations on the target stripe, so as to implement simultaneous read operations for the target stripe.

3) Each access request needs to be processed in the receiving order.

For example, upon receiving an access request A that wishes to perform a write operation for a certain target stripe 116 therein, the RAID 114 in the SPA 110 first needs to obtain the exclusive stripe lock for the target stripe. Assuming that there is no other access request performing the write operations for the target stripe, the access request A can obtain the exclusive stripe lock for the target stripe and then perform a write operation for the target stripe. If during this write operation, the RAID 134 of the SPB 130 receives an access request B that wishes to perform a write operation for a certain target stripe 136 therein, the target stripe 136 corresponding to the stripe 116 for which the write operation is being performed, the access request B would also attempt to obtain the exclusive stripe lock for the target stripe 136. At this time, apparently the access request B is unable to obtain the exclusive stripe lock, and thus the access request B cannot be executed for the target stripe. Only after the execution of the access request A for the SPA 110 is completed and the exclusive stripe lock is released, can the access request B obtain the exclusive stripe lock and perform the write operation for the stripe 136.

General principles of the stripe lock mechanism have been described above, and specific implementations of the stripe lock mechanism will be given below. In an embodiment of the present disclosure, the storage management system 100 implements management of the stripe lock mechanism based on two important data structures, namely a stripe lock chain and stripe lock cache. Specifically, the RAID 114 of the SPA 110 stores and maintains the stripe lock chain and the stripe lock cache for the SPA 110. Similarly, the RAID 134 of the SPB 130 stores and maintains the stripe lock chain and the stripe lock cache for the SPB 130. The details of the stripe lock chain and the stripe lock cache will be described below with reference to FIGS. 2 and 3.

Figure 2:
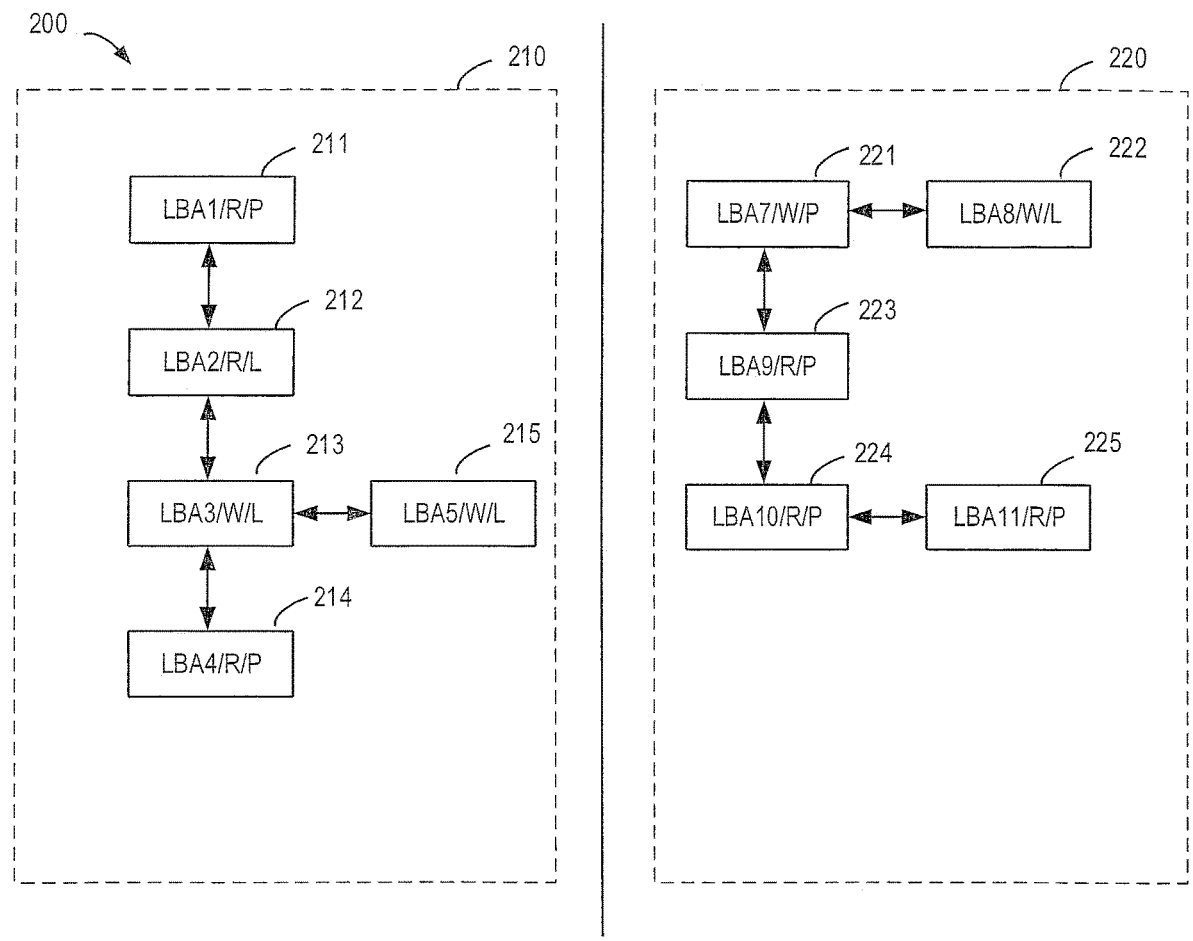
FIG. 2 illustrates a diagram of a stripe lock chain in the storage management system 100 according to one technical solution.

FIG. 2 illustrates a diagram 200 of a stripe lock chain in the storage management system 100 according to one technical solution. FIG. 2 shows both a stripe lock chain 210 in the SPA 110 and a stripe lock chain 220 in the SPB 130. Moreover, the stripe lock chain 210 includes a plurality of elements 211 through 215, and the stripe lock chain 220 includes a plurality of elements 221 through 225. It should be appreciated that the number of the elements illustrated are merely by way of example. Each element represents a stripe lock request of one I/O operation, and it includes information of three aspects: LBA information, operation attribute information and requesting party information. The LBA information is for recording an address region of specific logic blocks to which the I/O operation request is directed (for example, which logic block(s) on which stripe); the operation attribute information is for identifying whether the I/O operation request is a write operation (W) or a read operation (R); the requesting party information is provided for identifying whether the I/O operation request is from a local (L) SP or a peer (P) SP. For example, the information in the element 211 of the chain 210 is LBA1, R and P, which means that the access request corresponding to the element 211 corresponds to the logic block address region of LBA1, and is a read operation (R) and from the peer (P).

When a new I/O operation reaches, the local SP will check whether it can be inserted into the local lock chain based on its {LBA region information, operation attribute information, requesting party information}. Specifically, if the LBA region of the I/O operation request overlaps none of the LBA regions of the elements in the current stripe lock chain, it is considered that the I/O request does not conflict with any of the elements in the current stripe lock chain, such that this I/O request can be permitted by the local SP and added to the lower part of the stripe lock chain according to the incoming order. For example, a new element 214 is added to the chain 210 beneath the last element 214 as it conflicts with none of the other elements.

On the other hand, if the LBA region of the I/O operation request does overlap a LBA region of a certain element in the current stripe lock chain, it is considered that the I/O request conflicts with the element in the current stripe lock chain. In this case, the new I/O operation request needs to wait until the I/O request corresponding to the conflicting element is completed before it can be executed. Accordingly, in the stripe lock chain, the element corresponding to the new I/O operation request is placed in a transverse chain with the conflicting element. For example, the new element 214 is added to the chain at the right side of the element 213, since it conflicts with the element 213. It is seen that the stripe lock chain as described herein has a two-dimensional chain data structure.

It would be appreciated that information provided only based on the local stripe lock chain is not enough for an effective stripe lock mechanism. For each element in the stripe lock chain, it is necessary to examine whether the LBA region corresponding to each I/O operation has the access permission from the peer. The permission status of the peer for the access requests to each LBA region needs to be obtained by inquiring the stripe lock cache stored in a local access control unit. This will be described below in more detail with reference to FIG. 3.

Figure 3:
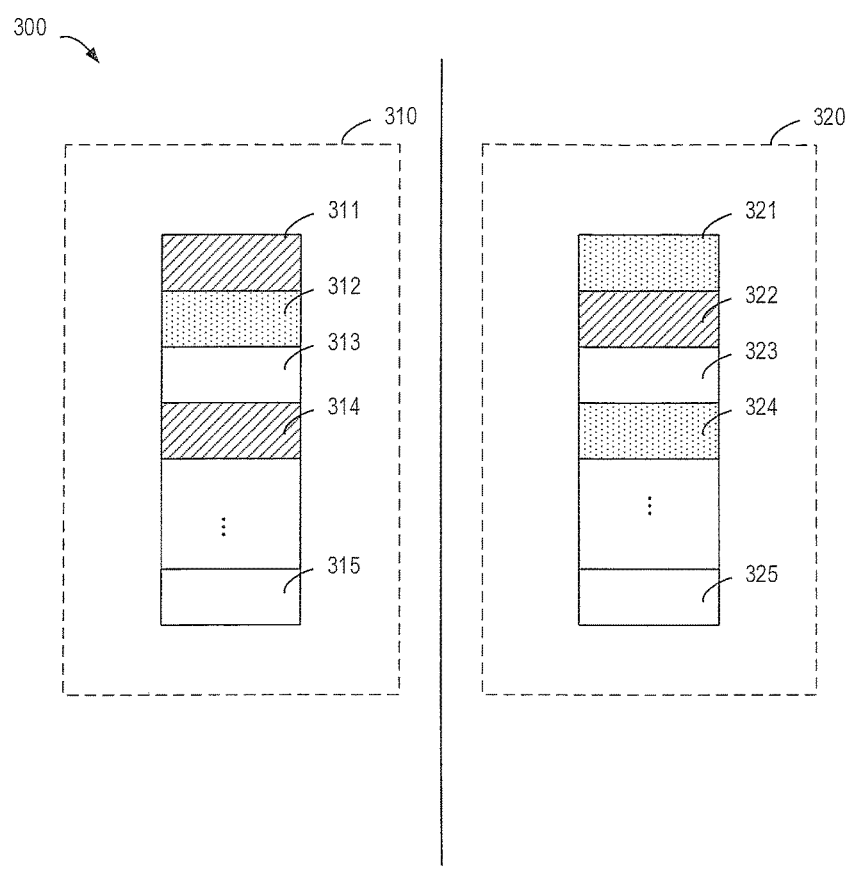
FIG. 3 illustrates a diagram of stripe lock cache in the storage management system 100 according to one technical solution.

FIG. 3 illustrates a diagram 300 of stripe lock cache in the storage management system 100 according to one technical solution. FIG. 3 shows both stripe lock cache 310 in the SPA 110 and stripe lock cache 320 in the SPB 130. The stripe lock cache 310 includes a plurality of units 311, 312 . . . 315 which are referred to as slots, and the stripe lock cache 320 likewise includes units 321, 322 . . . 325, each of which corresponds to a sub-region (which is also referred to as a storage area herein) of the logic storage space of the RAID. It should be appreciated that the number of the units illustrated are only by way of example.

Specifically, the logic storage space of the RAID can be divided uniformly into a preset number of storage areas. For example, if the logic storage space of the current RAID is 4 T in total and the number of the storage areas is set to be 2048, each storage area corresponds to a logic storage space of a size of 2G. Since the size of each storage area is bigger than that of each logic block or each stripe, the stripe lock management with coarser granularity can be achieved by dividing the RAID into storage areas for managing the stripe locks. It would be appreciated that "storage area" and "stripe" in the RAID as described herein are different terms. Moreover, a logic space size corresponding to each of the storage areas and the total number of storage areas in the stripe lock cache can be set by a user.

The stripe lock cache 310 stored in the RAID 114 in the SPA 110 has one-to-one correspondence with the stripe lock cache 320 stored in the RAID 134 in the SPB 130, wherein each of the storage areas therein and its peer storage area correspond to the same logic storage space, and both correspond to the same physical storage space. For example, in FIG. 3, units 311 and 321 correspond to each other, units 312 and 322 correspond to each other, and so on. Besides, each unit in the stripe lock cache identifies the current access state of the local SP to the storage area.

Specifically, each unit in the stripe lock cache 310, 320 can be in one of three states: exclusive, idle and shared. The exclusive state means that the local SP currently has an exclusive access permission to the storage area and can write data into the storage space of the storage area. It would be appreciated that if the local SP is currently in the exclusive state for a certain storage area, the peer SP can only be in the idle state for the storage area, i.e., it cannot perform any access operation. Likewise, if the local SP is currently in the idle state for a certain storage area, the peer SP must be in the exclusive state for the storage area. The shared state indicates that the local SP and the peer SP currently have shared access to a certain storage area. In this case, the local and peer SP can only perform read access to the storage area simultaneously.

Referring to FIG. 3, the unit 311 of the stripe lock cache 310 is currently in the exclusive state, and correspondingly, the unit 321 of the stripe lock cache 320 is in the idle state. Likewise, the unit 312 is in the idle state while the unit 322 is in the exclusive state. In addition, the unit 313 and the corresponding unit 323 are both in the shared state.

The stripe lock processing logic utilized according to one embodiment of the present disclosure will be described below in detail with reference to FIGS. 1 and 4. It would be appreciated that the "stripe lock" as described herein is not necessarily directed to a lock of a particular stripe, but should be interpreted as being directed to a lock of a particular storage area in logic storage space.

Figure 4:
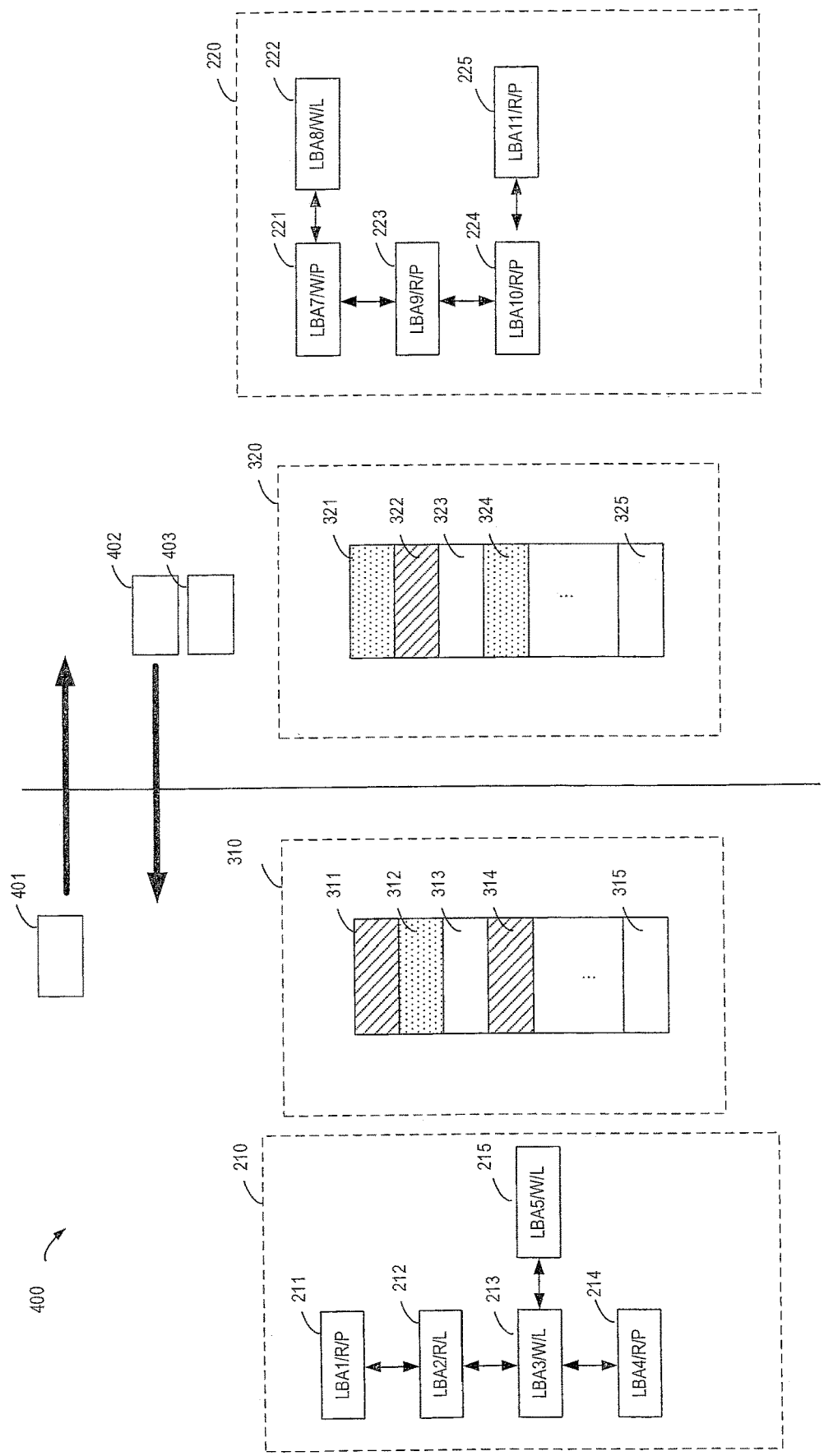
FIG. 4 illustrates a diagram of stripe lock processing logic utilized according to one embodiment of the present disclosure.

FIG. 4 illustrates a diagram 400 of stripe lock processing logic utilized according to one embodiment of the present disclosure. For ease of description, illustrations are made with an example in which the I/O access request received by the SPA 110 is a write request. According to one embodiment of the present disclosure, the write request from outside is transmitted to the access control unit 112 after entering the SPA 110. The high speed cache 118 in the access control unit 112 subsequently flushes the I/O access request and data into the RAID 114 in the SPA 110. The RAID 114 then examines the local stripe lock chain 210 maintained therein and determines (or identifies) whether the current write request can be permitted by the local SP (i.e., whether it conflicts with any of the elements 211 to 215 in the stripe lock chain). If it is determined that the current write request is not permitted by the local SP, the write request will be added to the transverse chain of the element with the LBA address range conflicting with that of the current request, and wait for the completion of execution of the respective I/O request corresponding to the conflicting element and the release of the stripe lock. If the permission of the local stripe lock chain 210 is determined, the method proceeds to the next step.

At the next step, based on the LBA region information of the current write request, the RAID 114 maps it to a respective unit in the local stripe lock cache 310. Then the state information of the unit is examined to determine whether the write request is permitted by the peer SP (namely, SPB 130). Specifically, if the state of the particular unit in the stripe lock cache 310 corresponding to the write request is "exclusive" (for example, unit 311), it indicates that the peer SP allows the write request to access the storage area corresponding to the unit as the state of the respective unit 321 of the peer SP must be "idle". In this case, other processing is not required, and the write operation request is then executed. If the state of the unit of the local stripe lock cache 310 is not "exclusive", the method proceeds to the next step.

Now, in order to write data to the storage area, firstly an "exclusive" permission for the particular storage area needs to be obtained. This can be implemented by sending a configuration management interface (CMI) message 401 from the SPA 110 to the SPB 130. By sending the CMI message 401 from the RAID 114 of the SPA 110 to the RAID 134 of the SPB 130, the SPB 130 can be requested to provide the access permission to the storage area. The CMI message 401 is transmitted to the SPB 130 via the CMI interface included in the SPA 110 and a respective transmission link. According to one example of the present disclosure, the transmission link may be a PCIe link which is embedded in the system backplane. Each SP communicates with a peer via CMI.

Specifically, upon receiving the CMI message, the SPB 130 examines the stripe lock chain 220 to determine whether the write operation from the SPA 110 can be permitted. If the write operation conflicts with the LBA region of a certain element in the stripe lock chain 220 of the SPB, the element corresponding to the write operation is also placed in a transverse chain in the stripe lock chain 220 and waits for the completion of execution of the conflicting I/O request. If the write operation does not conflict with any element in the stripe lock chain 220, it indicates that now the SPB can provide the write operation with the permission.

Then, the SPB 130 needs to send the CMI message 402 to the SPA 110 of the peer, so as to notify the access permission to the storage area for the requested write operation. In response to receiving the CMI message 402 sent from the SPB 130, the SPA 110 updates the unit in the stripe lock cache 310 that corresponds to the LBA of the write request, and sets its state to be "exclusive." Moreover, the SPA 110 also needs to send the CMI message 403 to the SPB 130 to notify it to set the state of its corresponding unit to be "idle." This means that the peer SPB 130 has successfully provided the local SPA 110 with the access permission to the storage area. As such, the RAID 114 of the SPA 110 obtains a stripe lock and then can execute the write operation.

Based on the stripe lock processing logic as described above, the SPA 110 and the SPB 130 can each process concurrent I/O requests from the outside without the concern about occurrence of data confliction or confusion. Such lock processing logic is often accompanied by the exchange of the plurality of CMI messages. For example, it is assumed that at a certain time point, the SPA 110 and the SPB 130 receive N new I/O requests respectively, and these I/O requests fall into the same stripe lock cache storage area.

Under this premise, Table 1 shows a count of CMI messages required to be exchanged in various circumstances.

TABLE 1

Count of exchanged CMI messages required by conventional lock processing logic

| SPA storage area | SPB storage area | CMI message count |
| --- | --- | --- |
| exclusive | idle | read: 3N |
|  |  | write: 3N |
| shared | shared | read: 0 |
|  |  | write: 6N |
| idle | exclusive | read: 3N |
|  |  | write: 3N |

Illustrations are made with an example in which the state of the storage area of the SPA 110 is "exclusive" and the state of the storage area corresponding to the SPB 130 is "idle." If all of the new I/O requests are read requests, the N read requests from the SPA 110 do not need to send the CMI messages at this time, and a read operation to the storage area is performed directly. Each read request from the SPB 130 needs 3 CMI messages: the first message is required to request a read operation permission from the SPA 110, the second message is required to return the read permission to the SPB 130, and the third message is required to notify the SPA 110 to release the corresponding stripe lock, i.e., to update the state of the corresponding storage area of its stripe lock cache to be "idle."

If all of the new I/O requests are write requests, N write requests from the SPA 110 do not need the CMI messages at this time, and a read operation to the storage area is performed directly. Each write request from the SPB 130 needs 3 CMI messages: the first message is required to request a write operation permission from the SPA 110, the second message is required to return the write permission to the SPB 130, and the third message is required to notify the SPA 110 to release the corresponding stripe lock, i.e., to update the state of the corresponding storage area of its stripe lock cache. The remaining cases in Table 1 are similar to these, which are omitted herein.

From the foregoing description, it can be obtained that if the I/O operation request flushed to the local RAID is not permitted by the local stripe lock cache, this means that the RAID of the peer SP has the stripe lock of the storage area to which the I/O operation is directed. The local RAID needs to transmit a CMI message via the PCIe link to the peer SP, and the RAID of the peer receives the CMI message and places it in a CMI message stack for processing. It would be appreciated that it takes some transmission and processing time to send and process the CMI messages related to the stripe lock mechanism based on the PCIe link. For the storage management system 100, since it includes a large number of concurrent I/O operations, accordingly, the number of the accompanied CMI messages related to the stripe lock mechanism increases greatly. This inevitably affects the system performance negatively.

According to the conventional stripe lock processing mechanism, the I/O access requests from the external host are randomly sent to the SPA 110 or SPB 130. The high speed cache MCC 118 included in the access control unit 112 of the SPA 110 receives and caches the I/O requests and data from the external host, and flushes the I/O access requests and data into the RAID 114 in the SPA 110, without differentiating them. As such, the access requests to be processed by the RAID 114 may be directed to all storage areas of the RAID (the RAID 134 has a similar condition).

Hence, the resulting changes of the state of the stripe lock cache are frequent, because the same LBA region is likely to be accessed by different write operations of the two SPs at the same time.

According to some embodiments of the present disclosure, there is provided a method of managing a storage system. The method includes: in response to a first control unit of the storage system receiving an access request to a target storage area in the storage system, determining (or identifying) whether the target storage area is in a first set of storage areas or in a second set of storage areas; in response to the target storage area being in the second set of storage areas, determining to process the access request by a second control unit of the storage system, wherein the first and second control units share the storage system; and updating an access state of the first control unit to the target storage area, the access state indicating access permission of the first control unit to the target storage area. Based on the method, the number of CMI messages related to the stripe lock mechanism in the dual-active-SP architecture can be reduced effectively. The method will be described below with reference to FIGS. 5 to 8 and FIG. 1.

Figure 5:
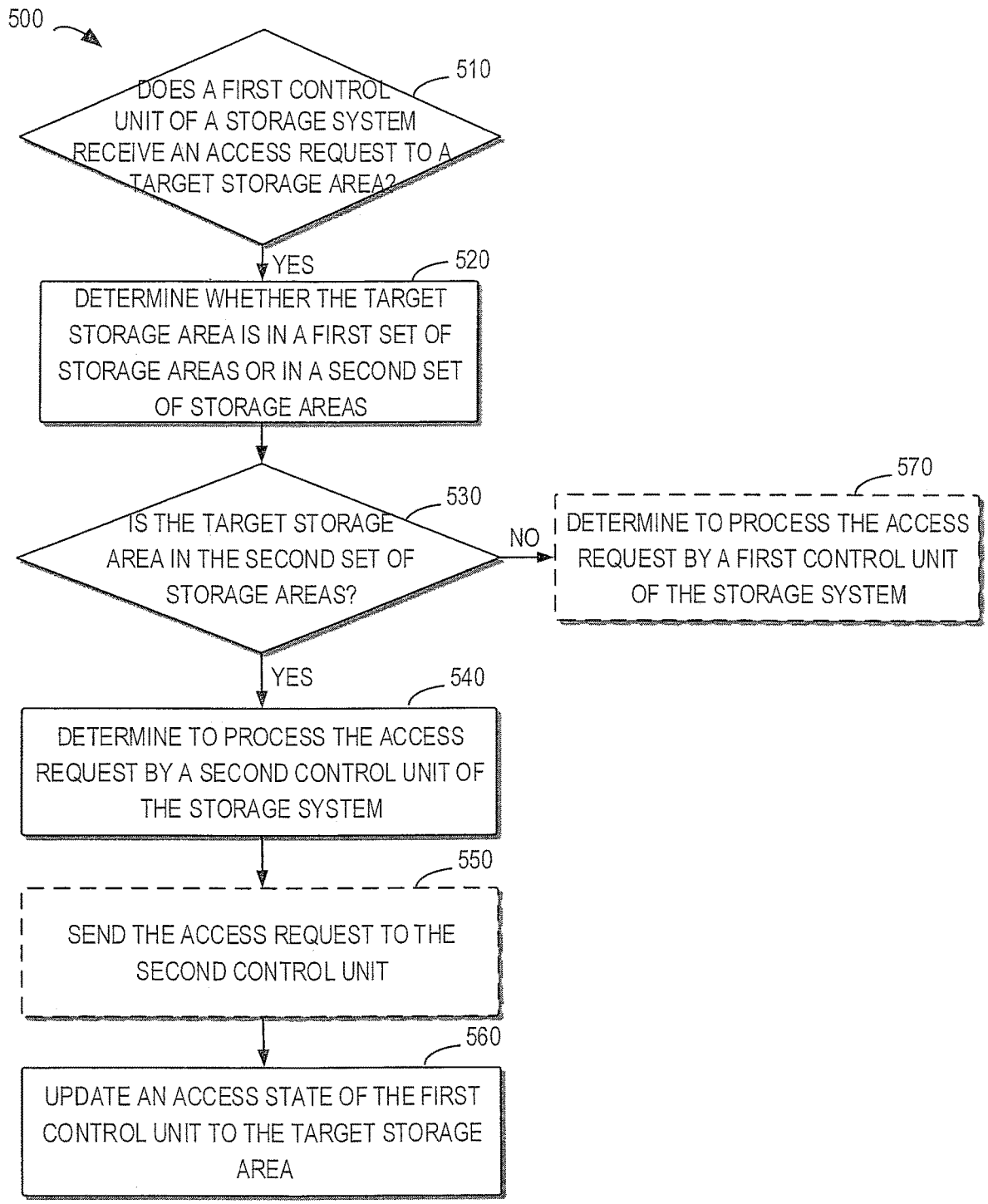
FIG. 5 illustrates a flowchart of a method of managing a storage system utilized according to one embodiment of the present disclosure.

FIG. 5 illustrates a flowchart of a method of managing a storage system utilized according to one embodiment of the present disclosure. At block 510, an I/O access request from an external host can be randomly assigned to the SPA 110 or the SPB 130. For ease of description, it is assumed that the SPA 110 receives the access request. The access request is received by the access control unit 112 in the SPA 110, and specifically received by the high speed cache MCC 118 therein. Subsequently, the MCC 118 determines (or ascertains) the LBA information of the I/O access request, i.e., the address region of logic blocks to which the I/O request is directed. The MCC 118 further determines (or ascertains) which storage area of the RAID the address region of logic blocks targeted by the I/O request is located. To be specific, the MCC 118 divides the RAID logic storage region in the same manner as dividing the stripe lock cache maintained by the RAID 114, and sets an index value for each divided sub-region (storage area).

Upon receiving an access request, the MCC 118 can determine (or ascertain) the specific index value of the target storage area corresponding to the current access request. It is to be noted that the MCC 118 no longer flushes all the access requests cached therein into the local RAID 114 without differentiating them, and instead, the MCC 118 processes accordingly the access requests by determining (or indicating) whether the target storage area is located in the first set of storage areas or the second set of storage areas.

Figure 6:
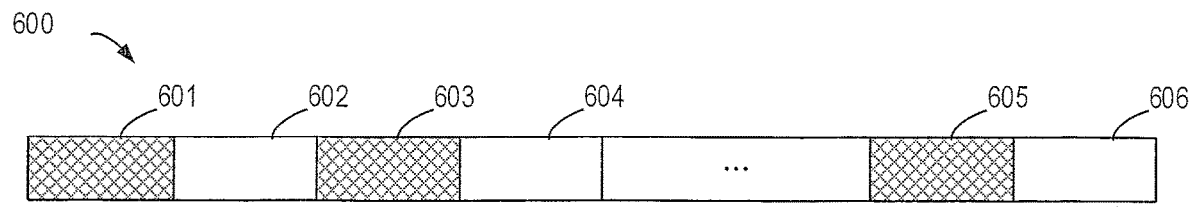
FIG. 6 illustrates a diagram of a manner of dividing a logic storage space according to one embodiment of the present disclosure.

For example, the access requests can be processed differently based on the index value of the target storage area corresponding to the access requests. In one example, it can be determined, based on the index value, whether the target storage area is located in the first set of storage areas or the second set of storage areas, and the different processing can be performed accordingly. In one example, the division can be performed based on parity attributes of the index value of the target storage area. In a further example, based on the index value, the target storage area can be divided into a first set of storage areas and a second set of storage areas, both with the substantially same number of storage areas. FIG. 6 illustrates a diagram 600 of a manner of dividing a logic storage space according to one embodiment of the present disclosure. As shown in FIG. 6, the logic storage space is divided into a plurality of storage areas 601, 602, 603 . . . 606, and the correspondence between each storage area and the SPA 110 and the SPB 130 is set according to the parity.

Specifically, the storage areas 601, 603 . . . 605 have even index values and thus are assigned to the SPA 110. The storage areas 602, 604 . . . 606 have odd index values and thus are assigned to the SPB 130. It would be appreciated that the specific dividing manner and the number of divided portions are not limited in the embodiments of the present disclosure, but for ease of description, the dividing manner according to the parity of index values will be described below as an example.

At block 520, if the MCC 118 determines that the target storage area is located in the second set of storage areas (for example, the index value is an odd number), the access control unit 132 of the peer SPB 130 is determined to process the access request, and thus the access request is transmitted via the local CMI interface 119 to the peer CMI interface 139 and input into the peer access control unit 132. The high speed cache MCC 138 in the access control unit 132 receives the access request and then flushes the access request to the RAID 134 of the SPB 130 for processing.

Correspondingly, if the MCC 118 determines that the target storage area is located in the first set of storage areas (for example, the index value is an even number), the local access control unit 112 is determined to process the access request and thus flushes the access request to the RAID 114 of the SPA 110.

Figure 7:
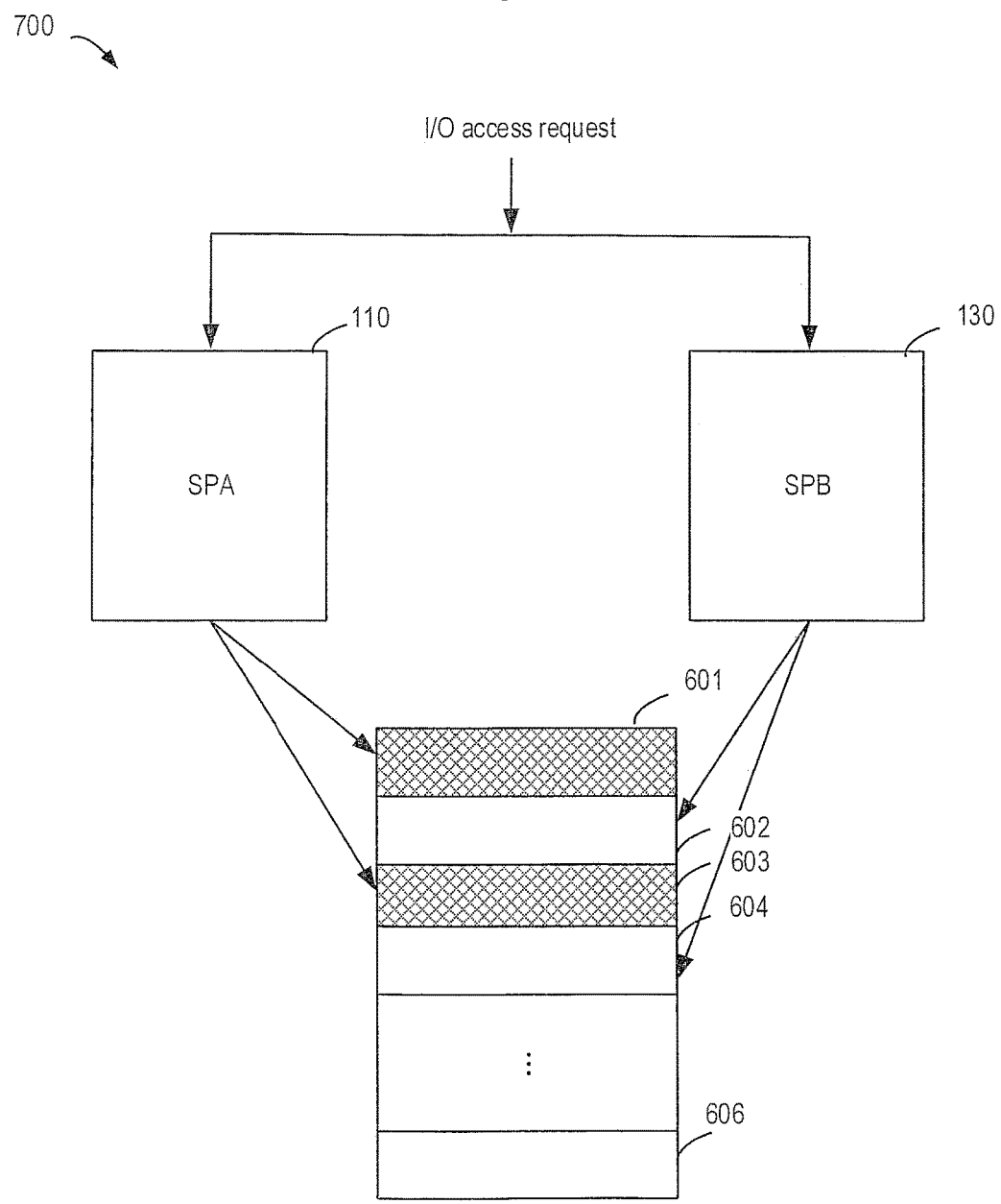
FIG. 7 illustrates a diagram of selectively assigning access requests according to one embodiment of the present disclosure.

Please refer to FIG. 7 for the manner of assigning the access requests based on the parity of the target storage area as described above. FIG. 7 illustrates a diagram 700 of selectively assigning access requests according to one embodiment of the present disclosure. It can be seen from the figure that for the plurality of divided storage areas 601, 602, 603 . . . 606, the SPA 110 only flushes the access requests to the storage areas of the RAID with an even index value, while the SPB 130 only flushes the access requests to the storage areas of the RAID with an odd index value.

Based on the dividing manner as described above, the logic storage space can be divided into two regions of substantially the same size, which are assigned to two SPs respectively for processing. For the manner of dividing the logic storage space based on the parity, the storage areas with odd index values are designated to the SPB 130, while the storage areas with even index values are designated to the SPA 110. The advantages of the dividing manner will become more obvious in the following description. For ease of description, illustrations are made below with an example in which the access operation is a write operation.

Figure 8A:
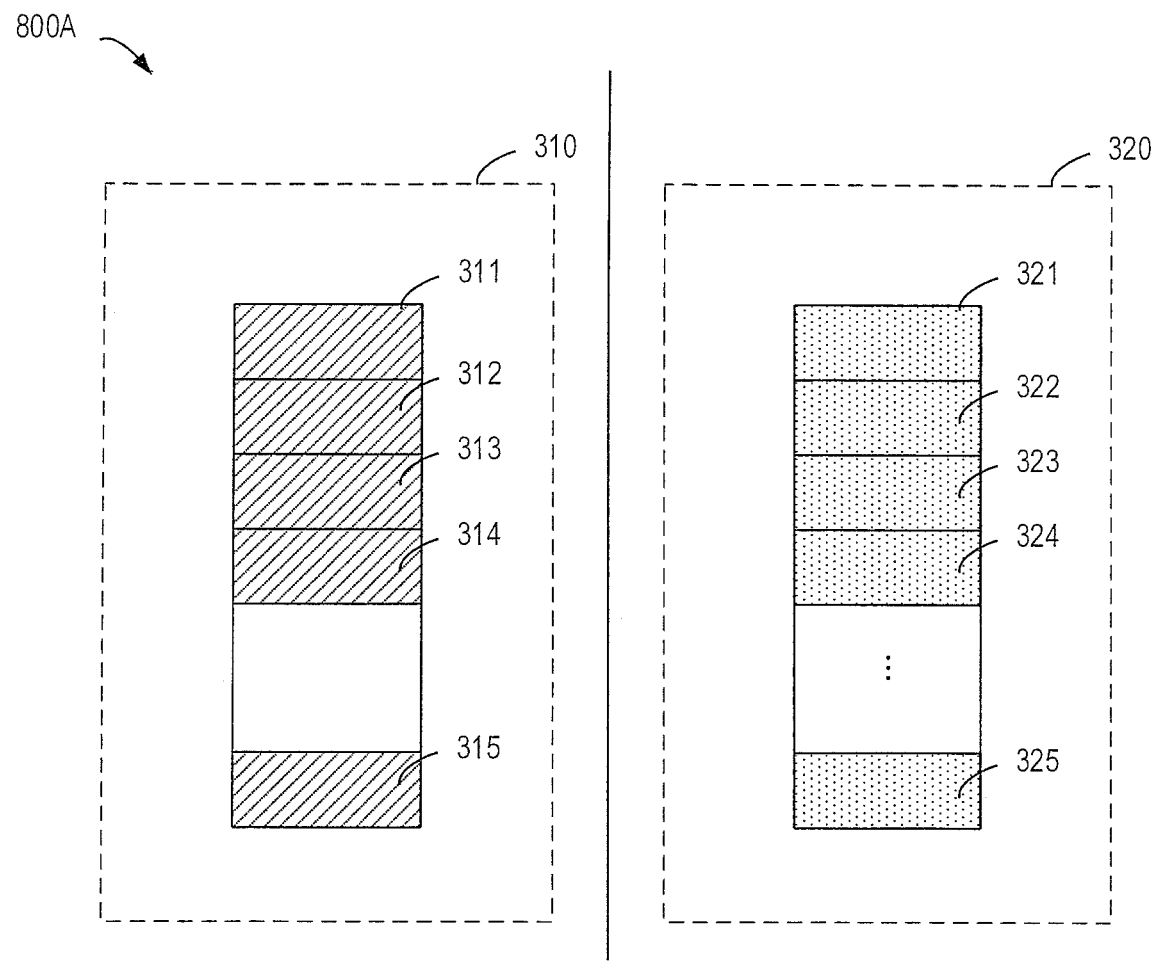
FIG. 8A illustrates a diagram of a state of stripe lock cache at an initial state according to one embodiment of the present disclosure.

FIG. 8A illustrates a diagram 800A of the stripe lock cache at an initial state according to one embodiment of the present disclosure. At the initial state when the storage management system 100 is enabled, the units 311 to 315 in the stripe lock cache 310 in the RAID 114 of the SPA 110 are all set to be in the "exclusive" state by default. Correspondingly, the units 321 to 325 in the stripe lock cache 320 in the RAID 134 of the SPB 130 are all set to be in the "idle" state at this time. If it is determined that the LBA region of the received write operation hits a storage area with an even index value, the local access control unit 112 is determined to process the access request and thus flushes the access request to the RAID 114 of the SPA 110 for processing. Since the respective unit of the stripe lock cache 310 for the storage area in the RAID 114 is in the "exclusive" state, it is unnecessary to transmit the CMI messages to obtain the stripe lock and the write operation can be executed directly.

If it is determined that the LBA region of the received write operation hits the storage area with an odd index value, the peer access control unit 132 is determined to process the access request. In this case, the access request of the write operation is transmitted via the local CMI interface 119 to the peer CMI interface 139 and input into the peer MCC 138. The high speed cache MCC 138 in the access control unit 132 receives the access request and then flushes the access request to the RAID 134 for processing.

At block 530, since the respective unit of the stripe lock cache for the storage area in the RAID 134 is in the "idle" state, it is necessary to transmit a CMI message to obtain the stripe lock at this time. To be specific, the RAID 114 of the SPA 110 provides permission to the peer RAID 134, and updates the state of the unit therein corresponding to the storage area with an odd index value to be "idle" after the peer obtains the stripe lock. In this case, the peer RAID 134 has updated the unit corresponding to the storage area to be "exclusive". It would be appreciated that some CMI messages are exchanged in this stage that is also referred to as the warm-up stage after enablement.

Figure 8B:
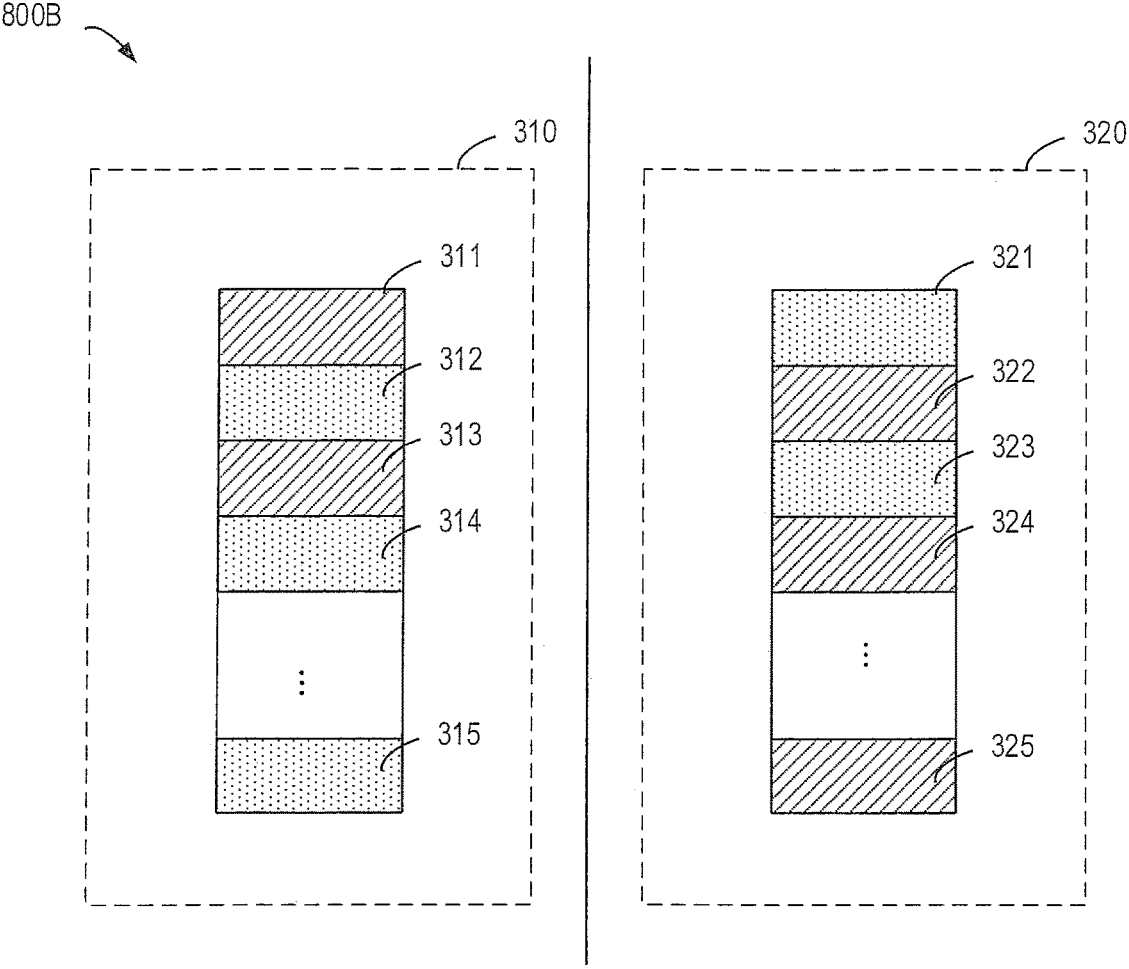
FIG. 8B illustrates a diagram of a state of stripe lock cache at a balanced state according to one embodiment of the present disclosure.

FIG. 8B illustrates a diagram 800B of a state of stripe lock cache in a balanced state according to one embodiment of the present disclosure. It would be appreciated that, after a period of warm-up, i.e., after the SPA 110 and the SPB 130 have processed the access requests for a period of time, respectively, the stripe lock cache in the two SPs achieves a stable balanced state, as shown in FIG. 8B, as all the access requests to the storage areas with odd index values are transmitted to the SPB 130 while all the access requests to the storage areas with even index values are transmitted to the SPA 110. In this balanced state and in the stripe lock cache 310 in the SPA 110, the units corresponding to the storage areas with even index values are all in the "exclusive" state, whereas the units corresponding to the storage areas with odd index values are all in the "idle" state.

Likewise, in the stripe lock cache 320 in the SPB 130, the units corresponding to the storage areas with even index values are all in the "idle" state, whereas the units corresponding to the storage areas with odd index values are all in the "exclusive" state.

In view of this, once the stripe lock cache of the two SPs of the storage management device 100 reach the balanced state, all the subsequent write operations are transmitted to the respective SPs for processing according to the parity attribution of the index values of the storage areas. At this time, as a unit in the stripe lock cache for a storage area is in the "exclusive" state, all the subsequent write operations can be executed directly, without any stripe lock obtaining operation. Accordingly, it is not necessary to transmit any CMI message associated with the stripe lock operation, thus optimizing the performance of the system.

It would be appreciated that at block 520, the local MCC 118 can determine that the target storage area is located in the second set of storage areas (for example, the index value is odd) and input the access request via the local CMI interface into the peer MCC 138. When the peer MCC 138 determines that the target storage area of the access request received by the SPB 130 is located in the first set of storage areas (for example, the index value is even), the local MCC 118 can also receive the access request from the peer MCC 138, flush it into the local RAID 114 and execute access.

From the foregoing description, it can be obtained that, in some embodiments of the present disclosure, there is provided an improved management method for a storage management system with a dual-active-SP architecture. In the method, by selectively assigning the access requests between the two SPs, the transmission and reception process of the CMI messages associated with the stripe lock obtaining operation can be greatly simplified, thereby saving time for transmitting and processing the CMI messages, and effectively enhancing the performance of the entire system.

As evidence, Table 2 shows comparative experimental results of the solutions before and after optimization according to one embodiment of the present disclosure. In the experiment, the solutions before and after optimization are compared by testing the number of the accumulated I/O per unit of time, e.g., per second. It can be concluded from the experimental results listed in Table 2 that the optimized solution can obtain performance enhancement of 9.7% with 99% CPU utilization ratio for both solutions. The effectiveness of the solution according to one embodiment of the present disclosure is fully verified.

TABLE 2

Comparisons of solutions before and after optimization

|  | Conventional solution | Optimized solution |
| --- | --- | --- |
| Number of accumulated I/O (IO/s) | 85625 | 93955 |
| CPU utilization ratio | 99% | 99% |

Figure 9:
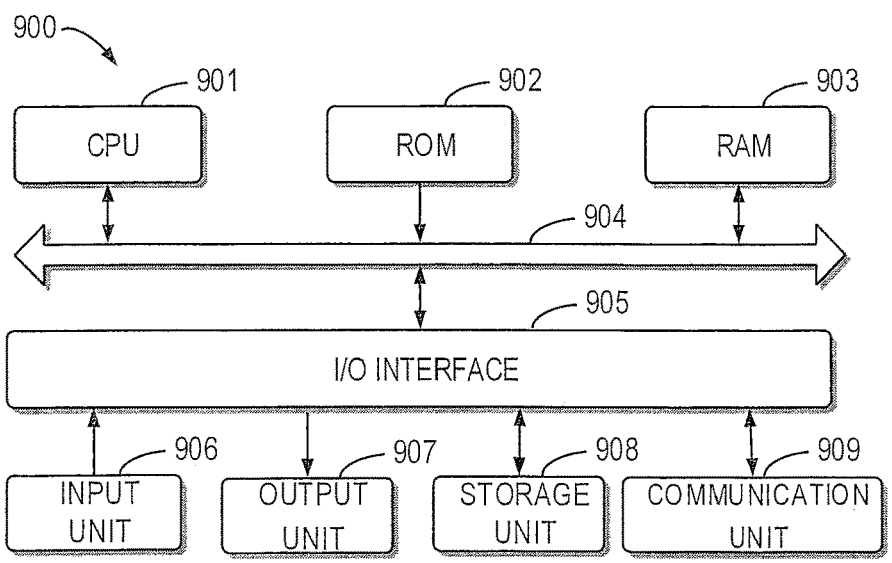
FIG. 9 illustrates a schematic block diagram of an apparatus 900 for implementing embodiments of the present disclosure.

FIG. 9 illustrates a block diagram of an apparatus 900 for implementing embodiments of the present disclosure. As shown, the apparatus 900 includes a central processing unit (CPU) 901 that may perform various appropriate actions and processing based on computer program instructions stored in a read-only memory (ROM) 902 or computer program instructions loaded from a storage unit 908 to a random access memory (RAM) 903. In the RAM 903, there further store various programs and data needed for operations of the apparatus 900. The CPU 901, ROM 902 and RAM 903 are connected to each other via a bus 904. An input/output (I/O) interface 905 is also connected to the bus 904.

The following components in the apparatus 900 are connected to the I/O interface 905: an input unit 906 such as a keyboard, a mouse and the like; an output unit 907 such as various kinds of displays and a loudspeaker, and the like; a memory unit 908 such as a magnetic disk, an optical disk, and the like; a communication unit 909 such as a network card, a modem, a wireless communication transceiver, and the like. The communication unit 909 allows the apparatus 900 to exchange information/data with other apparatuses through a computer network such as the Internet and/or various kinds of telecommunications networks.

In some embodiments, the processing unit 901 can be configured to execute various processes and processing described above, for example the method or process 500. For example, in some embodiments, the method or process 500 may be implemented as a computer software program that is tangibly embodied on a machine readable medium, e.g., the storage unit 908. In some embodiments, part or all of the computer programs may be loaded and/or mounted onto the apparatus 900 via ROM 902 and/or communication unit 909. When the computer program is loaded to the RAM 903 and executed by the CPU 901, one or more steps of the method or process 500 as described above may be executed.

Particularly, according to embodiments of the present disclosure, the process as described with reference to FIG. 5 can be implemented as a computer program product being tangibly stored on a non-transient computer readable storage medium, and includes machine executable instruction which, when executed, causes a machine to carry out aspects of the present disclosure.

The computer readable storage medium can be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of apparatuses, methods, and computer program products according to embodiments of the disclosure. It will be understood that each block of the flowchart illustrations and/or block diagrams, and combinations of blocks in the flowchart illustrations and/or block diagrams, can be implemented by computer readable program instructions.

Through the teaching given by the above description and the related drawings, many modifications and other embodiments of the present disclosure would be envisioned by those skilled in the art. Hence, it would be appreciated that the embodiments of the present disclosure are not limited to those disclosed herein, and modifications and other embodiments are intended to be covered in the scope of the present disclosure. In addition, although the example embodiments are described with certain example combinations of components and/or functionalities in the above description and related drawings, it would be appreciated that different combinations of components and/or functionalities as provided in alternative embodiments will not depart from the scope of the present disclosure. In this respect, for example, other combinations of components and/or functionalities different from those described explicitly above are anticipated to fall within the scope of the present disclosure. Despite the specific terminological terms used herein, they are only used with general descriptive meanings without any intention to suggest limitation.

We claim:

1. A method of operating a storage system having first and second control units with shared access to a logical unit of storage, comprising:
   in each of the control units, (1) employing a stripe lock scheme to effect dynamic lock-based transfer of access control of storage areas of the logical unit of storage between the control units, the stripe lock scheme including inter-control-unit messaging to dynamically transfer exclusive access control between the control units to enable the control units to process access requests for respective storage areas, and (2) employing a separate predetermined storage area assignment scheme by which respective sets of the storage areas are assigned to be processed by the first and second control units respectively, irrespective of access control according to the stripe lock scheme;
   in response to the first control unit of the storage system receiving an access request to a target storage area in the logical unit of storage, determining based on the predetermined storage area assignment scheme whether the target storage area is in a first set of storage areas of the logical unit of storage or in a second set of storage areas of the logical unit of storage, the first and second sets of storage areas being assigned to the first and second control units respectively;
   in response to the target storage area being in the first set of storage areas, processing the access request by the first control unit, the processing including, when needed according to a current stripe lock state, obtaining access permission for the target storage area from the second control unit using the inter-control-unit messaging;
   in response to the target storage area being in the second set of storage areas, (1) sending the access request from the first control unit to the second control unit, and processing the access request by the second control unit, and (2) updating an access state of the first control unit to the target storage area, the access state providing access permission of the first control unit for the target storage area to the second control unit,
   whereby over an operating period, the use of the predetermined storage area assignment scheme leads to a balanced access state in which the first control unit has obtained access permission for the first set of storage areas and the second control unit has obtained access permission for the second set of storage areas and there is correspondingly reduced inter-control-unit messaging.

2. The method of claim 1, wherein the predetermined storage area assignment scheme is parity-based, and determining whether the target storage area is in the first set of storage areas or in the second set of storage areas comprises:
   determining an index value of the target storage area; and
   determining, based on the index value, whether the target storage area is in the first set of storage areas or in the second set of storage areas, the first set of storage areas and the second set of storage areas being divided according to parity attributes of index values of the storage areas in the storage system.

3. The method of claim 1, further comprising:
   causing the second control unit to update an access state of the second control unit to the target storage area.

4. The method of claim 3, wherein the access state comprises one of:
   the exclusive state, indicating that the target storage area is currently accessible to the first control unit or the second control unit; and
   the idle state, indicating that the target storage area is currently inaccessible to the first control unit or the second control unit.

5. The method of claim 1, wherein the access request is a first access request and the target storage area is a first target storage area, the method further comprising:
   by the first control unit, receiving a second access request from the second control unit, the second access request being an access request to a second target storage area in the storage system that is received by the second control unit and sent from the second control unit to the first control unit for processing the access request; and
   by the first control unit, accessing the second target storage area based on the second access request.

6. The method of claim 1, wherein each of the control units maintains a respective stripe lock chain and stripe lock cache for the stripe lock scheme, the control units using the stripe lock chain to effect the dynamic lock-based transfer of access control of the storage areas of the logical unit of storage between the control units, the stripe lock cache being divided into units corresponding to the storage areas of the logical unit of storage, and the control units using the units of the stripe lock cache to effect state-based access control of the storage areas, the state-based access control including exclusive, shared, and idle states and messaging to dynamically transfer exclusive access control between the control units to enable the control units to process access requests for respective storage areas.

7. The method of claim 1, wherein, at a time the access request is sent from the first control unit to the second control unit, the access state of the target storage area at the first control unit is in the exclusive access state, and further including, by the second control unit during processing of the access request, exchanging messages with the first control unit to obtain exclusive access to the target storage area.

8. A storage system, comprising:
   a logical unit of storage; and
   first and second control units with shared access to the logical unit of storage, the control units being co-operative to:
      in each of the control units, (1) employing a stripe lock scheme to effect dynamic lock-based transfer of access control of storage areas of the logical unit of storage between the control units, the stripe lock scheme including inter-control-unit messaging to dynamically transfer exclusive access control between the control units to enable the control units to process access requests for respective storage areas, and (2) employing a separate predetermined storage area assignment scheme by which respective sets of the storage areas are assigned to be processed by the first and second control units respectively, irrespective of access control according to the stripe lock scheme;

in response to the first control unit of the storage system receiving an access request to a target storage area in the logical unit of storage, determining based on the predetermined storage area assignment scheme whether the target storage area is in a first set of storage areas of the logical unit of storage or in a second set of storage areas of the logical unit of storage, the first and second sets of storage areas being assigned to the first and second control units respectively;

in response to the target storage area being in the first set of storage areas, processing the access request by the first control unit, the processing including, when needed according to a current stripe lock state, obtaining access permission for the target storage area from the second control unit using the inter-control-unit messaging; and in response to the target storage area being in the second set of storage areas, (1) sending the access request from the first control unit to the second control unit, and processing the access request by the second control unit, and (2) updating an access state of the first control unit to the target storage area, the access state providing access permission of the first control unit for the target storage area to the second control unit, whereby over an operating period, the use of the predetermined storage area assignment scheme leads to a balanced access state in which the first control unit has obtained access permission for the first set of storage areas and the second control unit has obtained access permission for the second set of storage areas and there is correspondingly reduced inter-control-unit messaging.

9. The apparatus of claim 8, wherein the predetermined storage area assignment scheme is parity-based, and determining whether the target storage area is in the first set of storage areas or in the second set of storage areas comprises:
   determining an index value of the target storage area; and
   determining, based on the index value, whether the target storage area is in the first set of storage areas or in the second set of storage areas, the first set of storage areas and the second set of storage areas being divided according to parity attributes of index values of the storage areas in the storage system.

10. The apparatus of claim 8, wherein the acts further comprise:
   causing the second control unit to update an access state of the second control unit to the target storage area.

11. The apparatus of claim 10, wherein the access state comprises one of:
   the exclusive state, indicating that the target storage area is currently accessible to the first control unit or the second control unit; and
   the idle state, indicating that the target storage area is currently inaccessible to the first control unit or the second control unit.

12. The apparatus of claim 8, wherein the access request is a first access request and the target storage area is a first target storage area, wherein the acts further comprise:
   by the first control unit, receiving a second access request from the second control unit, the second access request being an access request to a second target storage area in the storage system that is received by the second control unit and sent from the second control unit to the first control unit for processing the access request; and
   by the first control unit, accessing the second target storage area based on the second access request.

13. A computer program product having a non-transitory computer readable medium which stores a set of instructions for operating a storage system having first and second control units with shared access to a logical unit of storage; the set of instructions, when carried out by the first and second control units of the storage system, causing the storage system to operate by:
   in each of the control units, (1) employing a stripe lock scheme to effect dynamic lock-based transfer of access control of storage areas of the logical unit of storage between the control units, the stripe lock scheme including inter-control-unit messaging to dynamically transfer exclusive access control between the control units to enable the control units to process access requests for respective storage areas, and (2) employing a separate predetermined storage area assignment scheme by which respective sets of the storage areas are assigned to be processed by the first and second control units respectively, irrespective of access control according to the stripe lock scheme;
   in response to the first control unit of the storage system receiving an access request to a target storage area in the logical unit of storage, determining based on the predetermined storage area assignment scheme whether the target storage area is in a first set of storage areas of the logical unit of storage or in a second set of storage areas of the logical unit of storage, the first and second sets of storage areas being assigned to the first and second control units respectively;
   in response to the target storage area being in the first set of storage areas, processing the access request by the first control unit, the processing including, when needed according to the stripe lock scheme, obtaining access permission for the target storage area from the second control unit using the inter-control-unit messaging; and
   in response to the target storage area being in the second set of storage areas, (1) sending the access request from the first control unit to the second control unit, and processing the access request by the second control unit, and (2) updating an access state of the first control unit to the target storage area, the access state providing access permission of the first control unit for the target storage area to the second control unit.

* * * * *